United States Patent [19]
Janke

[11] Patent Number: 4,508,670
[45] Date of Patent: Apr. 2, 1985

[54] METHOD AND APPARATUS FOR CONTROLLING THE TEMPERATURE IN THERMOFORMING MACHINES

[75] Inventor: Jürgen Janke, Heilbronn, Fed. Rep. of Germany

[73] Assignee: Adolf Illig Maschinenbau GmbH & Co., Heilbronn, Fed. Rep. of Germany

[21] Appl. No.: 402,342

[22] Filed: Jul. 27, 1982

[30] Foreign Application Priority Data

Sep. 5, 1981 [DE] Fed. Rep. of Germany ....... 3135206

[51] Int. Cl.³ ..................... B29C 17/03; B29C 17/04
[52] U.S. Cl. ................................. 264/40.6; 264/550; 425/143; 425/144; 425/170; 425/387.1; 425/398
[58] Field of Search ............... 264/40.6, 40.1, 550; 425/143, 144, 170, 173, 398, 387.1, 388

[56] References Cited

U.S. PATENT DOCUMENTS

| | | | |
|---|---|---|---|
| 2,797,179 | 6/1957 | Reynolds et al. | |
| 3,427,687 | 2/1969 | Miller | 425/388 |
| 3,583,467 | 6/1971 | Bennett et al. | 425/144 |
| 3,932,096 | 1/1976 | Kaitman | 425/398 |
| 4,354,812 | 10/1982 | Wieder et al. | 264/40.6 |
| 4,383,815 | 5/1983 | Kiefer et al. | 425/388 |

FOREIGN PATENT DOCUMENTS

| | | | |
|---|---|---|---|
| 1469405 | 1/1967 | France | |
| 72913 | 6/1981 | Japan | 264/40.6 |

OTHER PUBLICATIONS

Considine, Douglas M., "Process Instruments and Controls Handbook", McGraw Hill Book Co., 1974, N.Y., N.Y., pp. 19-19 to 19-20 and 18-19 to 18-21.

Primary Examiner—Jan Silbaugh
Assistant Examiner—Hubert C. Lorin
Attorney, Agent, or Firm—Spencer & Frank

[57] ABSTRACT

The temperature of upper and lower parts of a forming tool making deep-drawn thermoplastic articles is controlled with a system which performs the steps of passing a coolant of predetermined total volume through the upper part and the lower part of the forming tool; measuring the temperature of the upper and lower parts; determining the actual temperature difference between the upper and lower parts; comparing the actual temperature difference with a predetermined desired temperature difference; generating a signal representing the magnitude of deviation between the actual and desired temperature differences; and, as a function of the signal, increasing the volume of coolant passing through one of the forming tool parts and decreasing the volume of coolant passing through the other of the forming tool parts for reducing the magnitude of deviation while maintaining the total volume unchanged.

5 Claims, 3 Drawing Figures

METHOD AND APPARATUS FOR CONTROLLING THE TEMPERATURE IN THERMOFORMING MACHINES

BACKGROUND OF THE INVENTION

This invention relates to a method and an apparatus for controlling the temperature of the upper and lower portions of forming and stamping tools for the manufacture of thermoplastic containers. The apparatus is installed in the forming station of a thermoforming machine which draws a film web from a supply roll, heats the film web and thereafter sequentially deforms lengths of the film web in the forming station by means of the tool and by means of a differential pressure. Immediately following the deformation the same tool stamps out the container. After the tool is opened, the containers are conveyed away by means of systems known by themselves. The scrap web is wound or comminuted.

In thermoforming machines a shortening of the operational cycles (that is, an increase of the operational frequency) is sought for the purpose of increasing the output rate. The operational frequency is significantly affected by the cooling period necessary for the article made by the thermoforming machine. Such cooling period depends from several factors such as the type of the film, the film thickness, the film temperature during deformation and the shape of the formed article (container), particularly at its upper edge.

Since the film web is deep-drawn at temperatures in the order of magnitude of approximately 150°–200° C., the forming tool heats up during operation unless specifically cooled. During such heat-up the upper and lower portions of the tool will have different temperatures: normally a greater amount of heat is taken up by that tool part (usually the lower tool portion) which carries the mold proper. In practice it is therefore conventional to cool the lower tool part in order to achieve higher operational frequencies.

The critical zone during cooling of the article shaped in the thermoforming machine is mostly at the upper article edge which is thicker than the article wall and therefore needs a longer period for cooling. If the article (such as a container) is removed from the mold prematurely, its edge is distorted which is unacceptable if such an edge should, in use, perform a sealing function.

Because of the different temperature conditions in the upper and lower tool parts, conventionally two coolant circuits have to be controlled. As a rule, the thermoforming machine is associated with a refrigerating apparatus which delivers a coolant having the required low temperatures. Such a refrigerating apparatus operates usually with water as the coolant which is cooled to approximately 3° C. and is then introduced into the tool halves. Dependent upon operational conditions, with the aid of such a system the tool temperature may be maintained between 20° and 40° C.

The requirements for ever-increasing output in thermoforming machines have led to arrangements in which the forming and stamping tools can, without difficulty, work on film widths of 800 mm and the containers can be made in groups, in which the containers are distributed in several rows. In general, 8 to 10 containers per row are feasible, dependent upon the diameter of the container.

Since the containers are stamped in the tool subsequent to the forming operation, the tools have to be high-precision parts. Cutting dies and matrix bores have to be in an accurate alignment during stamping; the clearance between the two (that is, the cutting play) is in the order of magnitude of 0.04 mm.

If the forming tool is of substantial width, the temperature difference between the upper and lower tool parts may become excessive, whereupon, due to the unlike expansion of the parts, the cutting play may disappear. As a result, the outer cutting dies in the row run onto the matrix edges which leads to damages resulting in high costs and interruption of production.

By throttling the flow of the individual coolant streams to the upper and lower portions of the tool, it would be, to be sure, feasible to obtain for the two tool portions predetermined separate temperatures set at respective temperature regulators. Such an arrangement requires throttle mechanisms in the supply conduit for the coolant leading to the upper and lower tool portions and a system which controls the throttles. It is a disadvantage of this type of coolant control that not the entire coolant volume capable to be supplied by the refrigerating apparatus is utilized. This then means that the tool is not brought to the lowest possible temperature. Such a lowest possible temperature, however, is desirable because it would result in an optimal cooling of the formed container, thus leading to a maximum output rate. It is noted that the value of such a temperature is usually not known and depends from many factors.

SUMMARY OF THE INVENTION

It is an object of the invention to provide an improved method and apparatus for controlling the temperature of an upper and lower part of a molding tool in a thermoforming machine in such a manner that the entire coolant volume which the refrigerating apparatus is capable of supplying is admitted to the tool to thus achieve the lowest possible temperatures for the tool halves. The temperatures of the upper and lower parts may be identical or may differ from one another in a predetermined manner.

Normally, identical temperatures for the upper and the lower tool parts are desired. There are, however, instances where a temperature difference is advantageous. Some of the reasons which warrant such temperature differences are as follows:

(a) Significant components of the upper and lower tool part which undergo heat expansion during operation are of different materials having different coefficients of heat expansion.

(b) The small inner caliber differences of the stamping dies and matrix bores obtained in the mechanical manufacturing process may be adjusted by means of different temperatures.

(c) Usually, difficulties are involved as to how the temperature sensors should be mounted on the upper and lower tool portions in order to measure a characteristic temperature which is determinative for the heat expansion of the tool half. If in one tool half the temperature sensor is too close to a "cold" zone, whereas in the other tool half the temperature sensor has been mounted too close to a "hot" zone, such an "error" can be corrected by setting a predetermined temperature difference between the upper and lower tool halves.

These objects and others to become apparent as the specification progresses, are accomplished by the invention, according to which, briefly stated, the temperatures of the upper tool part and the lower tool part are measured by temperature sensors which apply corresponding signals to a temperature difference regulator. The latter controls a distributor valve such that the entire volume of the coolant is so distributed between the upper tool part and the lower tool part that a predetermined temperature difference is obtained between these tool components.

It is noted that as concerns the invention, the absolute temperatures assumed by the upper and lower tool parts are of no significance. What is of essence is to set a temperature equality or a temperature difference between the upper and the lower tool parts. The absolute temperature depends from many factors (air temperature, coolant temperature, film web temperature, type of film, thickness of film and operational frequency) and fluctuates during operation. At the beginning of the operation it has room temperature and thereafter oscillates to assume a predetermined value for the operation.

According to an additional feature of the invention, several temperature sensors for each tool half are used for deriving a mean temperature to enhance the accuracy of the temperature sensing.

According to a further feature of the invention, in case the temperature difference is excessive as compared to a predetermined value, the temperature difference regulator emits a signal which triggers either an optical or an acoustic signal or turns off the thermoforming machine. This ensures that damage to the tool is reliably prevented.

DESCRIPTION OF THE PREFERRED EMBODIMENT

Figure 1:
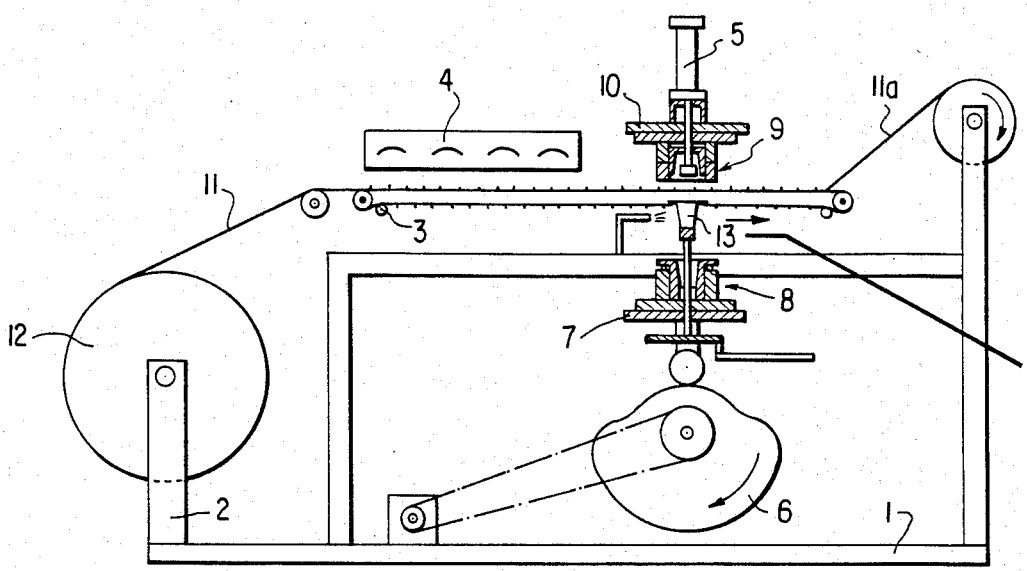
FIG. 1 is a schematic side elevational view, partially in section, of a thermoforming machine adapted to incorporate the invention.

Turning first to FIG. 1, a thermoforming machine adapted to incorporate the invention includes a frame 1, a support 2 for carrying a reel of film supply, a film web conveying mechanism 3, a heating station 4, a forming and stamping station 5 and a drive 6 for vertically reciprocating a table 7 which supports a lower portion 8 of a forming tool. An upper portion 9 of the forming tool is mounted on a stationary traverse 10. During operation, a film web 11 is drawn off the supply roll 12 and is subsequently heated in the station 4 and then deep-drawn in the forming and stamping station 5 by means of a plunger-assisted differential pressure. The finished articles (containers) 13 are conveyed out of the station 5, whereas the scrap band 11a is wound or comminuted.

Figure 2:
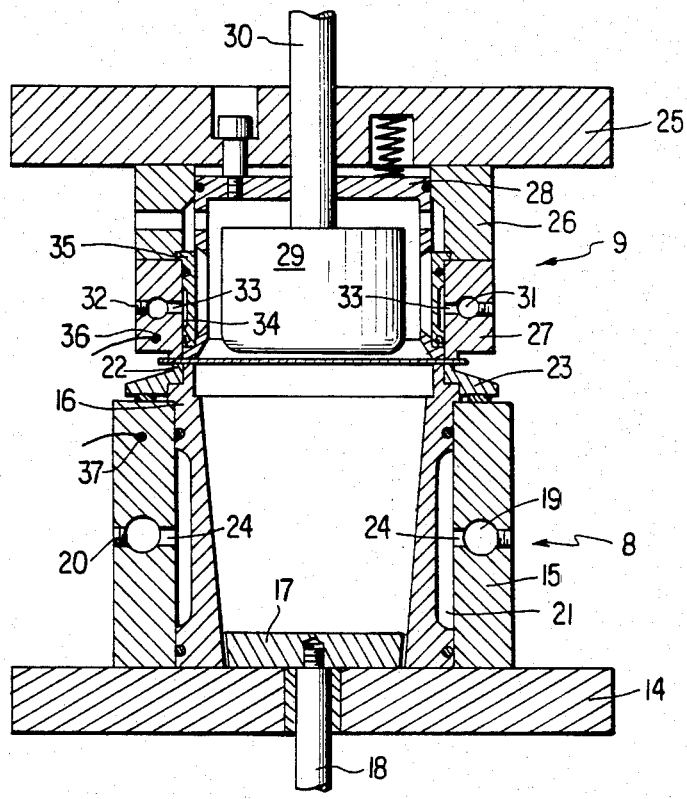
FIG. 2 is an axial sectional view of a forming tool of a thermoforming apparatus incorporating components of the invention.

Turning now to FIG. 2, there is illustrated in axial section a single-row forming tool for making containers. The lower portion 8 of the tool has a base plate 14, a cooling block 15 receiving, for example, eight molds 16 (only one shown) and a bottom 17 for each form 16. The bottoms 17 are mounted on a rod 18. In each mold form 16 there is provided a sharp peripheral inner top edge 22 which serves as a cutting edge. The mold 16 may be surrounded by a stripper 23. For cooling the forms 16, bores 19 and 20 are provided in the cooling block 15.

Inner walls of the cooling block 15 and outer walls of the forms 16 define annular chambers (only one shown) 21 which communicate with the bores 19 and 20 by means of respective ports 24 and which surround the respective mold 16. The bores 19 and 20 may be, respectively, coolant inlets and coolant outlets. It is, however, feasible to so connect the chambers 21 that the coolant flows therethrough in sequence.

The upper tool portion 9 is formed of a head plate 25, an intermediate plate 26, a matrix 27, a stripper or hold-down part 28 and a plunger 29 which assists in the drawing of the film 11 and which is mounted on a rod 30. A coolant inlet bore 31 and a coolant outlet bore 32 extend in the matrix 27 and, by ports 33 communicate with an annular chamber 34 defined by a sleeve 35 and the matrix 27. In this manner a particularly thorough cooling of the hold-down component 28 is achieved. Temperature sensors 36 and 37 (such as thermo-elements) are provided in the upper tool part 9 (preferably in the matrix 27) and the lower tool part 8 (preferably in the cooling block 15).

Figure 3:
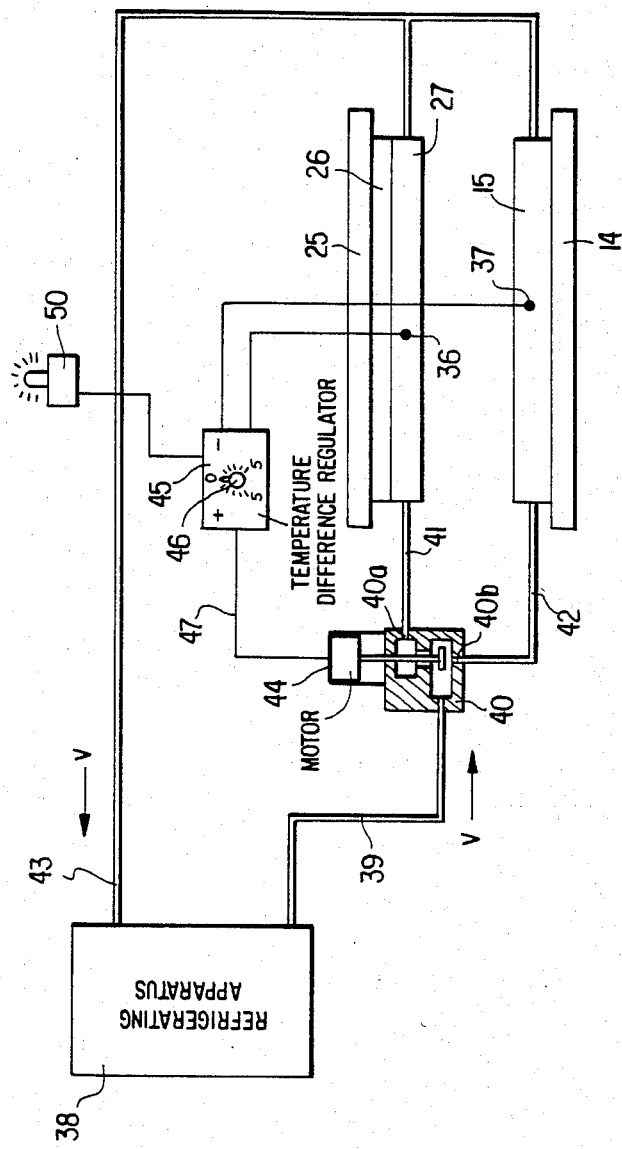
FIG. 3 is a diagrammatic view of a preferred embodiment.

In the description which follows, the method of regulating the temperature of the upper part 9 and the lower part 8 will be set forth with reference to FIG. 3.

A refrigerating apparatus 38 supplies a predetermined volume V of a coolant of predetermined temperature through a supply conduit 39 to a distributor valve 40. The distributor valve 40 has an outlet 40a which is connected by means of a conduit 41 with the bore 31 of the matrix 27 forming part of the upper tool part 9. The distributor valve further has an outlet 40b which is connected by means of a conduit 42 with the bore 19 of the cooling block 15 forming part of the lower part 8. A return conduit 43 re-introduces the coolant into the refrigerating apparatus 38 from the outlet bore 32 of the matrix 27 and the outlet bore 20 of the cooling block 15.

The temperature sensors 36 and 37 provided in the upper and lower tool parts, respectively, are connected with a temperature difference regulator 45. By means of a setting knob 46 a desired temperature difference between the upper tool part 9 and the lower tool part 8 may be set. The temperature difference regulator 45 generates an output signal from a comparison between the predetermined desired deviation and the actually measured temperatures of the upper tool part 9 and the lower tool part 8. The output signal is applied to the distributor valve 40 by means of a conductor 47. The output signal may be a power signal for driving a motor 44 which turns a setting spindle to displace a valve head 48 of the distributor valve 40. The position of the valve head 48 determines the distribution of the volume flow V through the valve outlets 40a and 40b and thus to the two tool halves 8 and 9.

If, for example, the temperature difference regulator 45 determines, for a preset desired temperature difference of 0° C., that the upper tool part 9 is 3° C. warmer than the lower tool part 8, then the motor 44 is so energized that to the upper tool portion 9 more coolant is supplied and, at the same time, the coolant supply to the lower tool part 8 is accordingly reduced, leaving the total volume V unchanged. Thus, the motor 44, to achieve this purpose, moves the valve head 48 downwardly as viewed in FIG. 3. If, in such a set position of the valve head 48 there is achieved a temperature equality, the valve head 48 remains in this position until, for example, because of operational circumstances, a temperature difference between the two tool parts 8 and 9 appears, whereupon an appropriate change of the position of the valve head 48 is again effected. The actual temperatures of the upper tool part 9 and the lower tool part 8 are immaterial; they are as low as can be achieved by the refrigerating apparatus 38 in the available volume flow V. It is thus seen that a throttling (reduction) of the flow V is not effected: the coolant flows at all temperature differences and at all actual temperatures of the upper part 9 and the lower part 8 in a constant total flow rate out of and back into the refrigerating apparatus 38 without any hindrance.

If, for example, because of an increase of the output rate of the thermoforming machine or an increase of the film temperature the tool temperature increases, the set temperature difference is maintained constant entirely automatically. Thus, the danger of a unilateral heating of one of the tool halves and the inherent temperature-caused expansion which would cause the cutting edge 22 to collide with the matrix 27 are securely eliminated.

Since, with the temperature sensors 36 and 37 only a limited zone of the upper part 9 and the lower part 8 are covered, it is of advantage to provide a plurality of temperature sensors for each tool half 8 and 9 and to form a mean temperature value in the temperature difference regulator 45. The latter then compares the difference between the mean temperature values determined for the upper tool part 9 and the lower tool part 8 respectively, with the preset desired temperature difference.

Since exceeding a predetermined temperature difference may cause serious damage, it is advantageous to connect the temperature difference regulator 45 by a conductor 49 with an optical or acoustic signalling device 50 which sounds an alarm if the predetermined temperature difference is significantly exceeded. Such an alarm signal may also be used for an automatic shut-off of the thermoforming machine. While normally, the temperature difference regulator 45 should prevent the occurrence of such an excess, a malfunction may nevertheless occur as a result of certain causes, such as clogging of one of the supply conduits 41 or 42.

In principle, it is feasible to arrange the distributor valve 40 at the outlet side of the tool halves 8 and 9 and then regulate the proportion of the flow V exiting from the upper part 9 and the lower part 8, respectively.

Using the method according to the invention solely in forming tools is in certain instances advisable in order to maintain, there too, a predetermined temperature difference in the upper and lower tool parts. In such an environment the purpose—rather than to control the heat expansion—is to ensure that the components which contact the film have approximately the same temperatures in order to prevent a unilateral significant quenching of the film. This is of importance particularly in forming foam films in a negative and positive matrix.

An usual temperature difference regulator 45 is delivered by Metrawatt, D 8500 Nürnberg, Germany under the number GTR 221.

It will be understood that the above description of the present invention is susceptible to various modifications, changes and adaptations, and the same are intended to be comprehended within the meaning and range of equivalents of the appended claims.

What is claimed is:

1. A method of controlling the temperature of upper and lower parts of a forming tool making deep-drawn thermoplastic articles, comprising the following steps:

(a) passing a coolant of predetermined total volume through the upper part and the lower part of the forming tool;
(b) measuring the temperature of said upper and lower parts;
(c) determining the actual temperature difference between said upper and lower parts;
(d) comparing the actual temperature difference with a predetermined desired temperature difference;
(e) generating a signal representing the magnitude of deviation between said actual and desired temperature differences; and
(f) applying said signal to a distributor valve connected to conduits passing through said upper and lower parts, thereby increasing the volume of coolant passing through one of said upper and lower parts and decreasing the volume of coolant passing through the other of said upper and lower parts for reducing said magnitude of deviation while maintaining said total volume unchanged; and further comprising the steps of applying the temperatures measured in step (b) to, and setting said desired temperature difference in, a temperature difference regulator; said steps (c), (d) and (e) being performed in said temperature difference regulator.

2. A method as defined in claim 1, further comprising the step of generating an alarm signal by said temperature difference regulator upon determining, in the performance of step (c), an excessive temperature difference between said upper and lower parts.

3. An apparatus for controlling the temperature of an upper and a lower part of a forming tool making deep-drawn thermoplastic articles, comprising (a) a first conduit means passing through said upper part of said forming tool for introducing coolant into and withdrawing coolant from said upper part;
(b) a second conduit means passing through said lower part of said forming tool for introducing coolant into and withdrawing coolant from said lower part;
(c) a distributor valve having a first coolant port, a second coolant port coupled to said first conduit means and a third coolant port coupled to said second conduit mant port, a second coolant port coupled to said first conduit means and a third coolant port coupled to said second conduit means, a movable distributing means for increasing the quantity of coolant delivered through one of the second and third coolant ports and simultaneously decreasing the quantity of coolant delivered through the other of the second and third coolant ports while maintaining the sum of the quantity of coolant flowing through said first and second conduit means and the respective second and third coolant ports of said distributor valve unchanged;
(d) first and second temperature sensors responding to the temperature of said upper and lower parts, respectively, and emitting first and second signals representing, respectively, the temperature of said upper and lower parts; and
(e) a temperature difference regulator operatively connected to said first and second temperature sensors for receiving said first and second signals for determining the actual temperature difference between said upper and lower parts, for comparing the actual temperature difference with a desired temperature difference and for generating a third signal representing the magnitude of deviation between the actual and desired temperature differences; said temperature difference regulator being further operatively connected to said distributor valve for applying said third signal to said distributor valve for varying the position of said movable distributing means to reduce said magnitude of deviation.

4. An apparatus as defined in claim 3, further comprising a refrigerator apparatus having a coolant output connected to said first coolant port of said distributor valve and a coolant input connected to said first and second conduit means.

5. An apparatus as defined in claim 3, further comprising alarm means connected to said temperature difference regulator for receiving and being actuated by a fourth signal generated in said temperature difference regulator and representing a predetermined excessive temperature difference between said upper and lower parts of said forming tool.

* * * * *